Jan. 28, 1964     L. H. WILLIAMS     3,119,204
SEALING DEVICE FOR BUILDING STRUCTURE JOINTS
Filed June 10, 1960
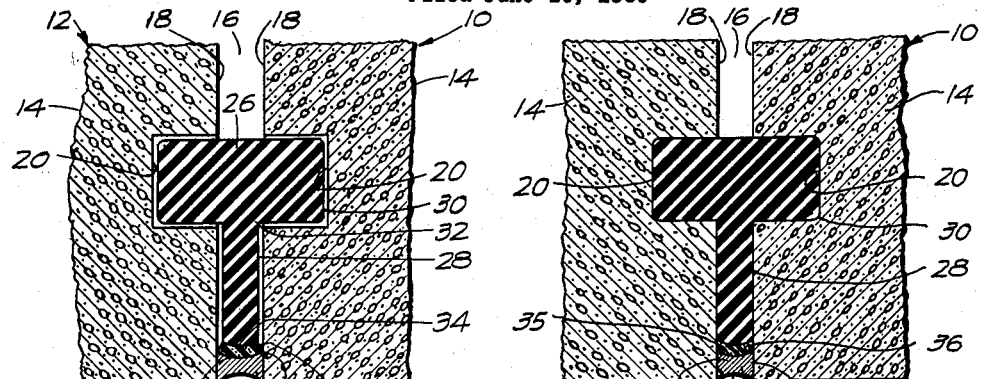
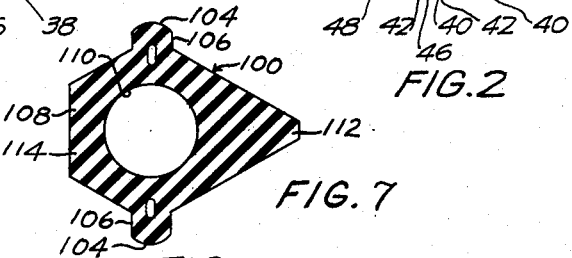
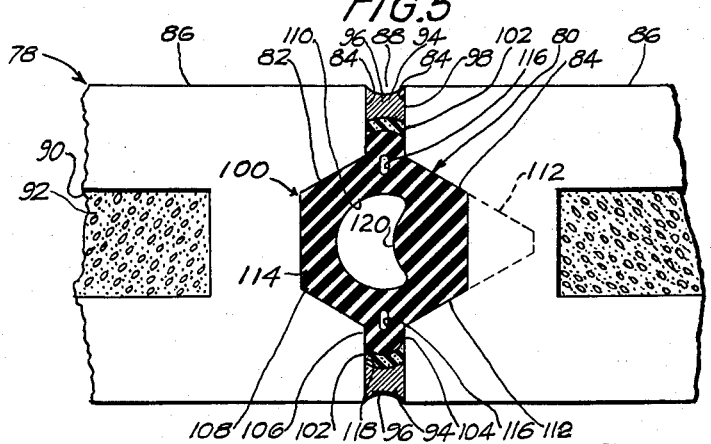
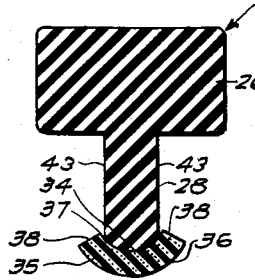
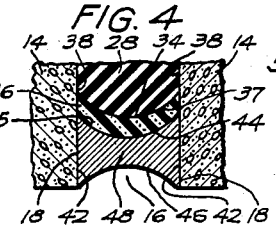
INVENTOR.
LLOYD H. WILLIAMS
BY Barthel & Bugbee
ATTORNEYS

United States Patent Office 3,119,204
Patented Jan. 28, 1964

3,119,204
SEALING DEVICE FOR BUILDING STRUCTURE JOINTS
Lloyd H. Williams, 17928 Kinross Ave., Birmingham, Mich.; Gladys M. Williams, administratrix of said Lloyd H. Williams, deceased
Filed June 10, 1960, Ser. No. 35,345
2 Claims. (Cl. 50—346)

This invention relates to sealing devices for sealing the intentional joints between building structural members such as prefabricated masonry blocks or slabs or poured concrete walls or slabs, such joints being variously described in the building construction art as constructional joints, expansion joints and control joints, according to the particular purpose intended for the joint.

One object of this invention is to provide a combined slab positioning and joint sealing device for intentional joints between building structural members which will automatically maintain the seal between the structural members to exclude the passage of water and other undesired substances, as well as to form a more efficient backing for yieldable caulking compound inserted in the joint.

Another object is to provide a combined slab positioning and joint sealing device of the foregoing character which has a backing member, preferably with a convex face, which will so configure the caulking compound that the central portion of the caulking layer is thinner than the edge portions adhering to the sides of the structural members within the joint, with the result that the adhesion of the caulking layer to the structural members is maintained regardless of contraction or shrinkage of the structural members with consequent detachment or breaking away, as occurred in prior sealing constructions.

Another object is to provide a combined slab positioning and joint sealing device of the foregoing character which will also fit into opposing grooves or recesses in the building structural members, thereby further enhancing the sealing of the joint.

Other objects and advantages of the invention will become apparent during the course of the following description of the accompanying drawings, wherein:

FIGURE 1 is a cross-section through an elongated combined slab positioning and joint sealing device, according to one form of the invention, in its relaxed condition, before insertion in an intentional joint between building structural members;

FIGURE 2 is a horizontal section through the combined slab positioning and joint sealing device of FIGURE 1 and adjacent structural components when inserted in the intentional joint between such members as initially laid and caulked with a layer of yieldable caulking compound;

FIGURE 3 is a view similar to FIGURE 2, but showing the appearance and continued sealing action of the combined slab positioning and joint sealing device and adhesion of the layer of yieldable caulking compound after contraction or shrinkage of the structural members has occurred;

FIGURE 4 is an enlarged fragmentary horizontal section corresponding to the lower central portion of FIGURE 2;

FIGURE 5 is a horizontal section through a modified combined slab positioning and joint sealing device, according to the invention, inserted in the intentional joint between grooved precast concrete slabs, together with external and internal layers of yieldable caulking compound, before shrinkage or contraction has taken place;

FIGURE 6 is a fragmentary horizontal section similar to FIGURE 4 but showing the defective prior art construction enabling breaking away or detachment of the layer of caulking compound; and FIGURE 7 is a cross-sectional view of the inner sealing member of FIGURE 5 in its relaxed condition with its resilient sealing strips omitted.

Hitherto, intentional joints between building structural members, such as stone or concrete blocks, precast concrete slabs or poured concrete walls or slabs have been attemptedly sealed by ramming backing material into the joint, leaving a recess at the outer portion of the joint, and then forcing a layer of yieldable caulking material into this recess. This construction gives satisfactory sealing action immediately after it is inserted, but one or both edges of the sealing layer soon break away from adhesion to the building structural members and permits water or other undesired substance to seep or otherwise pass through the joint. By extensive and painstaking research and study of such attemptedly-sealed prior constructions, the present invention has found that the cause of the break-away or detachment of the caulking layer in prior sealing arrangements results from the fact that the ramming of the backing material into the intentional joint causes it to acquire an outwardly-facing concave surface of approximately concave cylindrical configuration which in turn imparts an approximately cylindrical convex inner surface to the caulking compound, as shown in FIGURE 6.

Upon shrinkage or contraction of the building structural members in such a prior-sealed joint, the greater thickness of the thus-shaped caulking compound layer at its center thus formed prevents it from being stretched laterally as the facing ends of the structural members move away from each other. The reason for this is that the adhesion of the opposite edges of the caulking layer is never quite as strong as the force required for lateral elongation or stretching of the caulking material layer. As a consequence, as the joint widens during passage of time, the opposite lateral edges of the caulking compound layer fail to maintain their adhesion and break away from the surfaces of the structural members, creating gaps therebetween. Water and other substances then seep through these gaps, and damage accordingly occurs. This destroys the value of the caulking, as the proper caulking requires that a good adhesion of the caulking compound to the opposing faces of the building structural members be maintained regardless of the widening of the intentional joint between them. The present invention eliminates this disadvantage and defect of prior constructions and maintains the adhesion of the yieldable caulking compound layer to the opposite surfaces of the building structural members regardless of the widening of the joint between them, in the manner set forth below, by insuring that the layer of caulking compound will always be thinner at its center than at its opposite adhering edges.

Referring to the drawing in detail, FIGURES 1, 2 and 3 show a portion of a building structure, generally designated 10, such as a wall structure including a plurality of tiers 12 (one only being shown) of structural members 14, such as prefabricated concrete blocks or slabs or poured concrete walls or slabs, with an intentional or control joint 16 between their facing ends 18. The ends 18 are shown as containing grooves 20 preferably of rectangular cross-section. The grooves 20 face toward one another and are occupied by the lateral portion or flange 26, and the joint 16 is occupied by the longitudinal portion or web 28 of an elongated combined slab positioning and joint sealing device, generally designated 30, according to the present invention. The lateral and longitudinal portions 26 and 28 collectively form an elongated inner positioning strip or member 32 of approximately T-shaped cross-section, and are of approximately rectangular cross-section with thicknesses and widths preferably corresponding to the dimensions of the grooves 20 and the desired initial widths for the joints 16.

The elongated positioning strip or member 32 is preferably formed in bars or strips of suitable lengths by the extrusion of an elastomer such as rubber, synthetic rubber, synthetic plastic or the like having elastic deformable properties. The flange portion 26 is preferably of relatively greater thickness than the web portion 28. The latter has a convexly-curved outer edge 34, preferably with an approximately cylindrical surface. Cemented, vulcanized or otherwise secured thereto (FIGURE 1) is a resilient convexo-concave outer sealing and backing strip 36 of cellular elastomer material, such as synthetic or natural sponge rubber or foam rubber. From FIGURE 1 it will be seen that the resilient sealing strip 36 is of arcuate cross-section, with outer and inner approximately cylindrical convex and concave surfaces 35 and 37 with opposite ends 38 overhanging and projecting beyond the side surfaces 43 of the web portion 28 and converging toward them at an acute angle to one another in the relaxed condition of the sealing device 30 (FIGURE 1).

The cellular outer sealing and backing strip 36 may be molded separately or extruded integral with the web portion 28 of the T-section member 32 or it may also be vulcanized thereto as well as secured thereto by an adhesive, particularly if it is intended, as is desirable, to possess greater resilience than the inner T-section sealing member 32. The inner sealing member 32 is preferably of a so-called "hard rubber" of relatively high density and durometer test and possessing considerable stiffness. This is done in order to maintain its position accurately yet at the same time yield sufficiently to prevent cracking of the structural members 14. At the same time, the inner T-section sealing member 32 permits some relative shifting of the building structural members 14 during the subsequent life of the building or other structure of which they form a part. The outer resilient sealing strip 36, in contrast, is preferably made of exceedingly yieldable material requiring only a light pressure for its deformation, and sponge or foam rubber, synthetic rubber, or synthetic plastic has been found suitable for this purpose.

In the installation of the sealing device 30, as previously stated, the mason or other workman lays up the wall structure 10 tier by tier with a bed or layer of mortar (not shown) between each tier 12. After laying each block 14, he then selects a suitable length of the T-section sealing device 30 and inserts one edge of the flange or crossbar portion 26 into the groove 20 of the block or structural member 14 already laid. He then lays the next block 14 on its bed of mortar and slides it horizontally toward the previously laid block 14 until the joint 16 reaches its minimum width with the flange portion 26 filling the grooves 20 (FIGURE 2) and with the web portion 28 filling the portion of the joint 16 is which it is located. Since it is physically awkward and inconvenient for the workman to move a heavy block horizontally over a layer of mortar, it is thus preferable to impart the greatest practical resilience to the outer sealing strip 36 in order to reduce the required horizontal force to a minimum. Otherwise, the workman would find himself hindered in so doing by the considerable opposing forces which would be set up by the friction between the block and the layer of mortar, and the resistance to deformation of a relatively stiff sealing strip 36. The outer sealing strip 36 is therefore preferably formed of cellular material, but with the cells closed so as to prevent seepage of water through pores which might otherwise exist.

In pushing the block or structural member 14 toward the previously-laid structural member 14, the opposite ends 38 of the outer sealing strip portion 36 are deformed from their relaxed acute-angled relationship (FIGURE 1) into substantial parallelism with one another (FIGURE 2), because of the parallelism of the ends 18 of the structural members 14. The mason continues working in the above-described manner until the tier 12 of members 14 is laid, whereupon he applies another layer of mortar on their tops and then lays up the remaining tiers 12 of blocks 14 or other masonry members in the same way.

The mason then caulks the end of the joint adjacent the outer sealing strip 36 with a layer 40 of yieldable caulking compound in the usual way, using a conventional caulking gun with a suitable plastic caulking compound, such as a polysulphide caulking material from the group known commercially by the trade name of Thiokol group. The layer 40 of caulking compound thus extends as a strip along the outer end of the joint 16, and because of its adhesive nature its opposite ends 42 adhere firmly to the masonry member ends 18. At the same time, the convexity of the outer surface 35 of the resilient outer sealing strip 36 imparts to the rearward surface 44 of the caulking layer 40 an approximately cylindrical configuration. The configuration of the outer surface 46 of the caulking layer 40 depends upon the shape of the nozzle of the caulking gun and is preferably either flat or, as shown in the drawings, concave. In either case this renders the central portion 48 of the caulking layer 40 of lesser thickness than the widths of the opposite ends 42.

In the subsequent life of the building or other structure containing the structural members 14 forming the sealed joint structure 10, the inevitable changes inherent in the behavior of structural materials cause changes in the widths of the intentional joints 16. For example, if the structural members 14 are concrete blocks, the concrete thereof shrinks or contracts in the course of time as its moisture content declines as a result of the natural drying out action which occurs following the original manufacture of the blocks. Furthermore, the structure 10 itself lengthens or shortens in accordance with thermal expansion or contraction resulting from the changing temperatures between winter and summer. Settling of the building occasionally also causes a variation in the widths of the intentional joints 16.

The consequent changes, in this manner, of the widths of the intentional joints or gaps 16, as shown by the contrast between FIGURES 2 and 3, cause the arcuate resilient outer sealing strips 36 to expand or contract while its opposite ends 38 continue to maintain effective sealing contact or engagement with the adjacent block ends 18 in the gap or joint 16. Meanwhile, the plastic sealing layer 40 stretches laterally as the joint or gap 16 widens in the course of time. As a consequence of its thinner center 48 and wider or thicker opposite edges 42 resulting from the convexity of the sealing device surfaces 34, 37 and 35, the ends 42 maintain their adhesion to their respective structural member ends 18. This occurs because the force of such adhesion exceeds the force required to stretch the thin-centered caulking layer 40 laterally, as the joint or gap 16 widens (FIGURES 1 to 4 inclusive).

In the prior art sealing device shown in FIGURE 6, however, as the joint or gap 56 between the structural members 58 widens, the opposite ends 60 of the thicker-centered plastic caulking layer 62 break away from one or both of the structural member ends 64, leaving a crevice or gap through which water can seep. This occurs because the thicker-centered caulking layer 62 requires a greater force to stretch it laterally than the force with which the ends 60 of the caulking layer 62 adhere to their respective structural member ends 64. This in turn results from the wrongly concave configuration of the edge surface 66 of the prior art backing strip 68 imparting a convex inner surface 60 to the caulking layer 62. In this manner, the sealing device 30 of the present invention continues to maintain a most effective water stop regardless of variations in the widths of the intentional joints or gaps 16 over an indefinite period of time, by enabling expansion or contraction of the sealing layer while maintaining edge adhesion thereof.

The outer portion of the resilient sealing strip 36 nearest its outer surface 35 can freely stretch as required by the stretching of the caulking layer 40 to which it is secured, even through the inner portion of the resilient sealing strip nearest its inner surface 37 cannot stretch, but remains substantially fixed because of the relative inexpansibility of the dense rubber web 28 of the inner sealing member 32 to which it is secured.

The modified sealing device, generally designated 80, shown in FIGURE 5 as applied to a portion of a building structure 78, is especially intended for fitting into the half-hexagonal end grooves or recesses 82 in the opposite ends 84 of adjacent conventional precast concrete slabs 86 shown in top plan view in FIGURE 5 and separated from one another by the intentional joints or gaps 88 to be sealed. The central portion of each slab 88 has a hollow 90 containing a cellular filler 92, such as the material known commercially under the trade name Styrofoam, a synthetic plastic foam product. Each joint or gap 86 is also sealed by yieldable layers 94 of polysulphide sealing compound which are thinner at their centers 96 than at their adhering opposite edges 98 for the same reasons set forth above in the description of FIGURES 1 to 4 and 6.

The sealing device 80 consists of an elongated inner sealing member 100 (FIGURE 7) of hollow asymmetrical hexagonal shape including arcuate resilient outer sealing strips 102. The latter are secured by vulcanization or adhesives to the convex approximately cylindrical surfaces 104 of ribs 106 projecting in diametrically opposite directions along the joint or gap 88 and integral with the hollow asymmetrical hexagonal body 108 of the sealing member 100. The latter is preferably of dense or so-called hard rubber or synthetic rubber of a relatively high durometer test similar to that described above in connection with the T-section member 32 of FIGURES 1, 2 and 3. A hollow or bore 110 extends lengthwise of the body 108. Like the sealing members 32, the sealing members 100 are produced by extrusion in suitable lengths, such as 32 inches. The body 108 has asymmetrical opposite halves 112 and 114, the half 112 projecting laterally farther than the half 114 (FIGURE 7) but deformed inwardly during laying up (FIGURE 5). The hollow or bore 110 imparts a slight yieldability or resilience to the inner sealing member 100 and hollows 116 are formed adjacent the junctions of the ribs 106 with the body portion 108 to add resilience at those locations. The resilient outer sealing strips 102 are arranged in a similar manner to the sealing strips 36 of FIGURE 1 and are wider than the portions 106 so that their edges 118 similarly overhang or project laterally beyond the portions 106 to which the strips 102 are secured. The sealing strips 102 are sufficiently cellular so as to be deformable with a similarly very light pressure, such as was mentioned above in connection with the sealing strip 36 of FIGURE 1. This is for the same purpose of enabling the blocks or slabs 86 to be slid sidewise on the mortar bed by the mason without requiring him to exert heavy horizontal pressure.

The operation of laying up the precast concrete slabs 86 is similar to that described above for the building structural members 14 and the inner sealing members 100 of the sealing device 80 are inserted in the groove 82 in a similar manner. During laying up, the opposite ends or edges of the arcuate outer sealing strips 102 are compressed and deformed into parallelism because of their engagement with the substantially parallel ends 84 of the slabs 86. The convex approximately cylindrical configuration of the outer surfaces of the outer sealing strips 102 results in the forming of the sealing layers 94 with thinner centers 96 than edges 98, in the manner described above for the sealing layers 40. Similar materials are used for such sealing layers 40 and 94, and these are applied by a conventional gun, as described above.

During the subsequent life of the building structure 78, contraction or shrinkage or other relative shifting of the slabs 86 and 86 which changes the width of the joints 88 is automatically taken up by expansion or contraction of the resilient outer sealing strips 102 and the sealing layers 94. The convex surfaces 104 on the projecting ribs 106 produce similar convexities on the sealing strips 102, which results in the sealing layers 94 having thinner centers 96 than edges 98. This in turn causes the yieldable sealing layers 94 to be held by the slabs 86 by a greater adhesive force between their edges 98 and their respective slab end surfaces 84 than the force required to stretch the thin-centered yieldable sealing layers 94, for the reasons set forth in connection with the operation of the sealing devices 30 and yieldable sealing layers 40 of FIGURES 1 to 4 inclusive.

What I claim is:
1. A combined slab positioning and joint sealing device for insertion in oppositely-facing grooves in the oppositely-facing ends of a pair of prefabricated masonry building slabs separated by a gap joint, said positioning and sealing device comprising an elongated resilient inner slab positioning strip of approximately T-shaped cross-section formed of relatively stiff elastic deformable material having a web portion of approximately rectangular cross-section adapted to be disposed in the joint and having a flange portion of approximately rectangular cross-section disposed transversely to said web portion and adapted to be disposed at its opposite edges in the oppositely-facing groove within the masonry slab ends, said web portion having substantially parallel opposite side surfaces and an outwardly-bulging outer end surface disposed transversely to said side surfaces and having a convexly-curved cross-sectional configuration, and an elongated resilient outer joint sealing strip of arcuate cross-section formed of elastic deformable material of much greater resilience than the material of said slab positioning strip and of greater cross-sectional width than said web portion thereof secured coextensively and transversely to said convexly-curved outer surface of said web portion and having free opposite edge portions projecting laterally beyond said opposite side surfaces of said web portion in laterally-overhanging relationship therewith, said outer joint sealing strip bending inwardly toward the opposite edges of said flange portion of said slab positioning strip.

2. A combined slab positioning and joint sealing device, according to claim 1, wherein said outer joint sealing strip is formed of foam elastic deformable material.

References Cited in the file of this patent
UNITED STATES PATENTS

| | | |
|---|---|---|
| 2,032,814 | Robertson | Mar. 3, 1936 |
| 2,111,114 | Fischer | Mar. 15, 1938 |
| 2,125,857 | Fischer | Aug. 2, 1938 |
| 2,198,084 | Jacobson | Apr. 23, 1940 |
| 2,208,005 | Krumholtz | July 16, 1940 |
| 2,315,588 | Brickman | Apr. 6, 1943 |
| 2,400,493 | Fischer | May 21, 1946 |
| 2,405,844 | Mortenson | Aug. 13, 1946 |
| 2,431,384 | Fischer | Nov. 25, 1947 |
| 2,540,251 | Fischer | Feb. 6, 1951 |
| 2,619,884 | Jacobson | Dec. 2, 1952 |
| 2,708,016 | Penton | May 10, 1955 |
| 2,869,356 | Kulhavy et al. | Jan. 20, 1959 |